(12) United States Patent
Yang et al.

(10) Patent No.: US 7,697,081 B2
(45) Date of Patent: Apr. 13, 2010

(54) PIXEL STRUCTURE OF LIQUID CRYSTAL DISPLAY COMPRISING V-SHAPED DRAIN AND SOURCE ELECTRODES AND METHOD FOR ACTIVATING A STATE TRANSITION OF A LIQUID CRYSTAL LAYER

(75) Inventors: Sweehan J. H. Yang, Tainan (TW); Po-Yang Chen, Yang-Mei (TW); Po-Sheng Shih, Hsinchu (TW); Zhao-Hui Wu, Lujhu Township, Taoyuan County (TW)

(73) Assignee: Hannstar Display Corporation, Yang-mei, Tao-Yuan County (TW)

( * ) Notice: Subject to any disclaimer, the term of this patent is extended or adjusted under 35 U.S.C. 154(b) by 493 days.

(21) Appl. No.: 11/494,338

(22) Filed: Jul. 27, 2006

(65) Prior Publication Data
US 2008/0024468 A1    Jan. 31, 2008

(51) Int. Cl.
G02F 1/133    (2006.01)
G02F 1/136    (2006.01)
G02F 1/1337   (2006.01)
C09K 19/02    (2006.01)

(52) U.S. Cl. .................. 349/33; 349/43; 349/126; 349/168

(58) Field of Classification Search ............... None
See application file for complete search history.

(56) References Cited
U.S. PATENT DOCUMENTS

| | | | |
|---|---|---|---|
| 6,005,646 A | 12/1999 | Nakamura et al. | |
| 6,115,087 A | 9/2000 | Ohi | |
| 6,226,058 B1 | 5/2001 | Ohi | |
| 6,597,424 B2 | 7/2003 | Hattori et al. | |
| 6,661,491 B2 | 12/2003 | Yamakita et al. | |
| 6,671,009 B1 | 12/2003 | Hattori et al. | |
| 6,801,284 B2 | 10/2004 | Hattori et al. | |
| 6,873,377 B2 | 3/2005 | Konno et al. | |
| 6,933,916 B2 | 8/2005 | Nakao et al. | |
| 7,009,673 B2 * | 3/2006 | Matsumoto et al. | 349/141 |
| 2003/0122767 A1 * | 7/2003 | Nakao et al. | 345/96 |
| 2006/0087599 A1 * | 4/2006 | Sohn | 349/43 |

* cited by examiner

*Primary Examiner*—Andrew Schechter
*Assistant Examiner*—Paisley L Arendt
(74) *Attorney, Agent, or Firm*—Volpe and Koenig, P.C.

(57) ABSTRACT

A method for activating a state transition of a liquid crystal in a liquid crystal display is provided. The liquid crystal display has a first substrate, a second substrate and plural pixel structures, wherein the liquid crystal is sandwiched between the first substrate and the second substrate and each of the plural pixel structures has a transistor having a first electrode and a second electrode. The method including steps of: providing a first potential difference between the first electrode and the second electrode to generate a first electric field; providing a second potential difference between the first substrate and the second substrate to generate a second electric field; and transitioning the liquid crystal from a non-display alignment state to a display alignment state by the first and the second electric fields.

20 Claims, 6 Drawing Sheets

PIXEL STRUCTURE OF LIQUID CRYSTAL DISPLAY COMPRISING V-SHAPED DRAIN AND SOURCE ELECTRODES AND METHOD FOR ACTIVATING A STATE TRANSITION OF A LIQUID CRYSTAL LAYER

FIELD OF THE INVENTION

The present application relates to a pixel structure and a driving method for a liquid crystal display, and more particularly to the transistor structure of the pixel structure and the driving method for the optically compensated birefringence (OCB) mode liquid crystal display.

BACKGROUND OF THE INVENTION

In recent years, studies on the optically compensated birefringence (OCB) cell that is to be used as a liquid crystal cell instead of a twisted nematic (TN) cell have been widely spread. In the OCB mode liquid crystal display, the liquid crystal molecules therein are aligned from homogenous state to splay state at the initial state when an external voltage is applied. However, when a higher voltage difference is applied to the OCB mode liquid crystal display, the liquid crystal molecules therein will transit from the splay state to the bend state, and it is required to spend some time for the transition above. In the bend state, the top and bottom liquid crystal molecules are always oriented symmetrically, and thus to compensate the birefringence of liquid crystal molecules so as to obtain the uniform viewing angle characteristic at all directions is more easily than that obtained with the orientation division method, and a high-speed response characteristic that is one order faster than that for the conventional TN cells may also be accomplished accordingly.

Figure 1A:
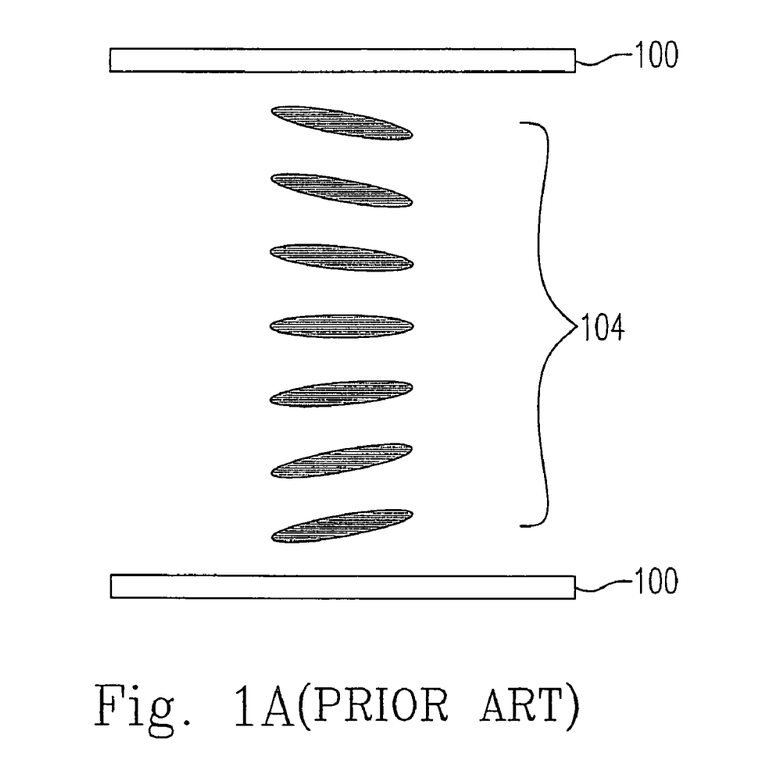
FIGS. 1A and 1B respectively illustrate the liquid crystal molecules in splay state and bend status in the OCB mode liquid crystal display device.
Figure 1B:
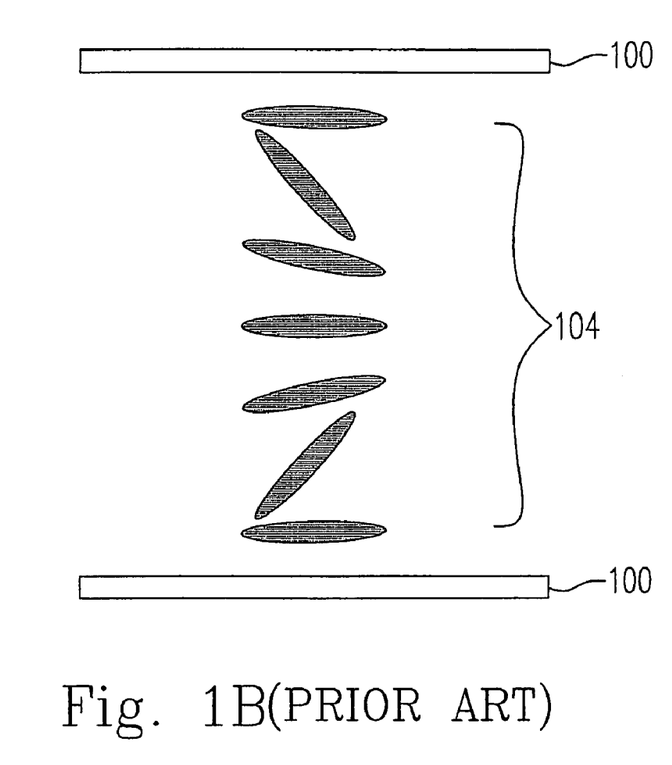

FIGS. 1A and 1B respectively illustrate the liquid crystal molecules in splay state and bend state in the OCB mode liquid crystal display device. As shown in FIG. 1A, in a splay state, the liquid crystal molecules 104 are uniformly splayed between the upper and lower substrates 100 and 102. However, when a voltage difference is applied to the glass substrates 100 and 102, the liquid crystal molecules 104 will transited into the bend state, as shown in FIG. 1B. In which, the transition time of the liquid crystal molecules 104 from the splay state to the bend state is one of the determinants for the OCB mode liquid crystal display device due to the fact that all the electro-optical properties of the OCB mode liquid crystal display device are operated when the liquid crystal molecules therein are in bend state.

However, some pixel structures was disclosed, such as what is disclosed in U.S. Pat. Nos. 6,115,087, 6,226,058, 6,661,491 and 6,597,424 but some of them are not suitable for OCB mode liquid crystal display devices, in addition a extra electrode existing in original pixel structures for transitioning the state of the liquid crystal was further disclosed in U.S. Pat. No. 6,933,916 and a auxiliary pier structure existing in the pixel structure with large voltage difference was disclosed in U.S. Pat. No. 6,801,284. However there still exist some demerits in those disclosed conventional pixel structures, for example, a space exists between the pixel electrode and the gate electrode, and the common electrode must be introduced and overlapped with the pixel electrode for a certain area so as to form a storage capacitor. However, the above two demerits will result in a small aperture which decrease the brightness and the contrast of the panel thereof.

In addition, although some driving methods for a liquid crystal display have been disclosed, such as that Takayuki Konno et al., (U.S. Pat. No. 6,873,377) and Katsuji Hattori et al., (U.S. Pat. No. 6,671,009) have disclosed a driving method for an OCB mode liquid crystal display and Hajime Nakamura et al., (U.S. Pat. No. 6,005,646) have disclosed another driving method for a thin film transistor liquid crystal display (TFT/LCD), there still exist some defects in the disclosed driving methods. For example, the driving method proposed by Katsuji Hattori et al. has a complicated signal input procedure and the applied system design always needs an alignment transition driving circuit, a switching control circuit and a switching circuit. In other words, the cost for the driving method of Katsuji Hattori et al. is always high and the relevant driving method is not so practical, especially for the trend of compactness. In addition, since the potential difference between the signal electrode and the common electrode is more than 10 volts and that between the gate electrode and the signal electrode is also more than 10 volts in the driving method proposed by Hajime Nakamura, there might exist some problems about the poor uniformity and the slow transition time in driving method of the prior arts.

As above, since all the electro-optical properties of the OCB mode liquid crystal display device are operated only when the liquid crystal molecules therein are in bend state, the liquid crystal molecules in the OCB mode liquid crystal display devices need to be transformed from the splay state (non-display state) into the bend state (display state) before being used and there still exist some demerits in the conventional pixel structures and driving methods, a new driving methods with excellent aperture ratio, sufficient brightness, clearly contrast and good uniformity for activating OCB mode liquid crystal display device are desired.

SUMMARY OF THE INVENTION

In accordance with one aspect of the present application, a method for activating a state transition of a liquid crystal in a liquid crystal display is provided. The liquid crystal display has a first substrate, a second substrate and plural pixel structures, wherein said liquid crystal layer is sandwiched between said first substrate and said second substrate and each of said plural pixel structures has at least one switching element having a first electrode and a second electrode, said method including steps of: providing a first potential difference between said first electrode and said second electrode to generate a first electric field; and performing an initialization process from said first and said second electrodes to transfer alignment state of said liquid crystal layer from splay to transition.

In accordance with another aspect of the present application, a method for operating a liquid crystal display is provided. The liquid crystal display has a first substrate, a second substrate, plural pixel structures and a liquid crystal layer sandwiched between said first substrate and said second substrate, wherein each of said plural pixel structures has at least one switching element having a first electrode and a second electrode, so as to transfer said liquid crystal display from a start up phase to a normal operation phase, said method including steps of: providing a pulse signal to said first and said second electrodes via said turn-on switching element and providing periodic pulse signal to one of said first and said second electrodes which connects to data line while said switching element is turned off to generate a first electric field (lateral electric field); providing a potential difference between said first and said second substrates to generate a second electric field; driving said liquid crystal display from said start up phase to said normal operation phase by said first and said second electric fields (vertical electric field); and providing operating signals to said plural pixels.

The foregoing and other features and advantages of the present invention will be more clearly understood through the following descriptions with reference to the drawings, wherein:

DETAILED DESCRIPTION OF THE PREFERRED EMBODIMENTS

The present application will now be described more specifically with reference to the following embodiments. It should be noted that the following descriptions of preferred embodiments of this application are presented herein for the aspect of illustration and description only; it is not intended to be exhaustive or to be limited to the precise form disclosed.

Figure 2A:
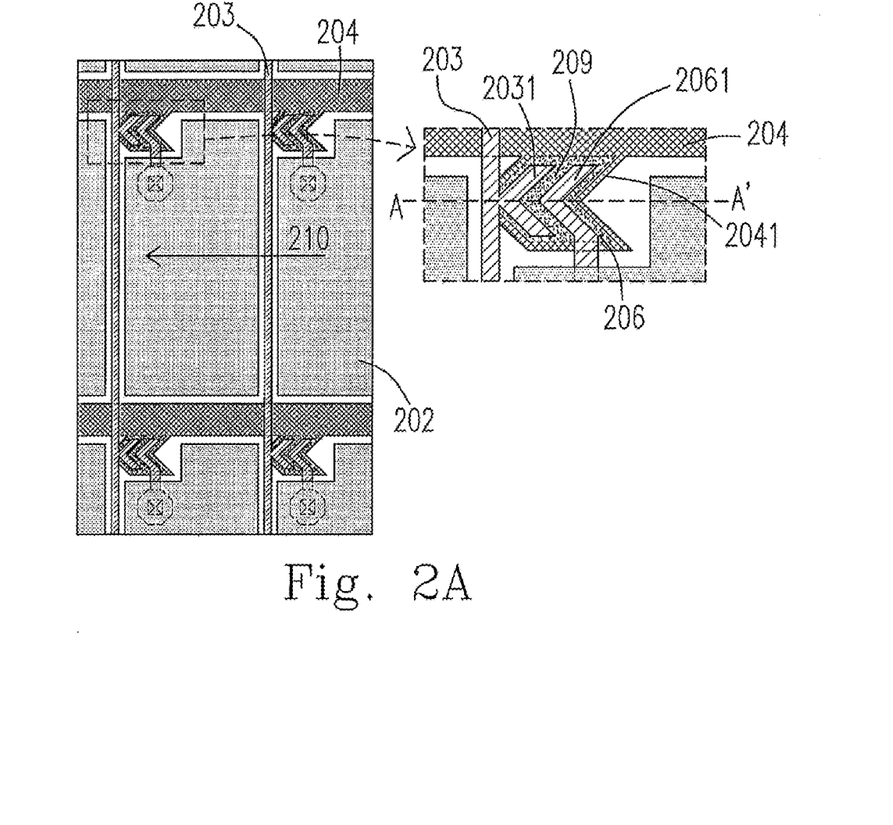
FIGS. 2A and 2B respectively show the pixel structures of the optical compensated birefringence mode liquid crystal displays according to a first preferred embodiment of the present invention and the cross-sectional view along the AA' line in FIG. 2A.
Figure 2B:
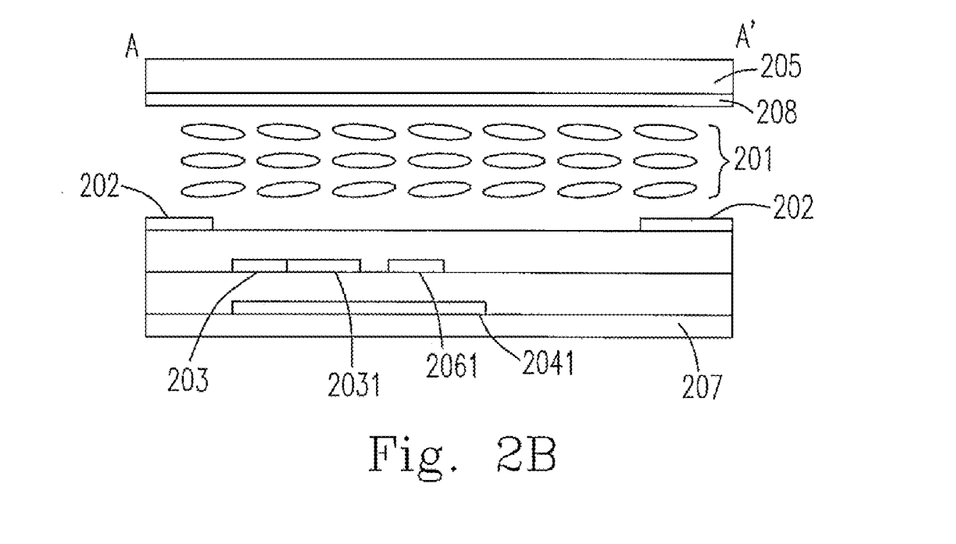
Figure 2C:
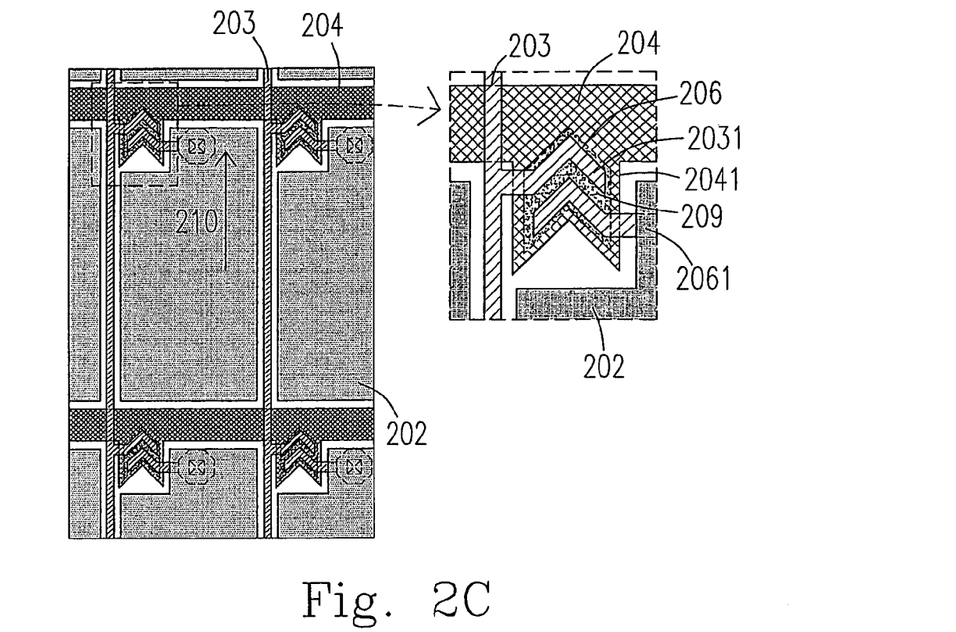
FIG. 2C to 2D respectively show the pixel structure of the optical compensated birefringence mode liquid crystal displays according to other preferred embodiments of the present invention.
Figure 2D:
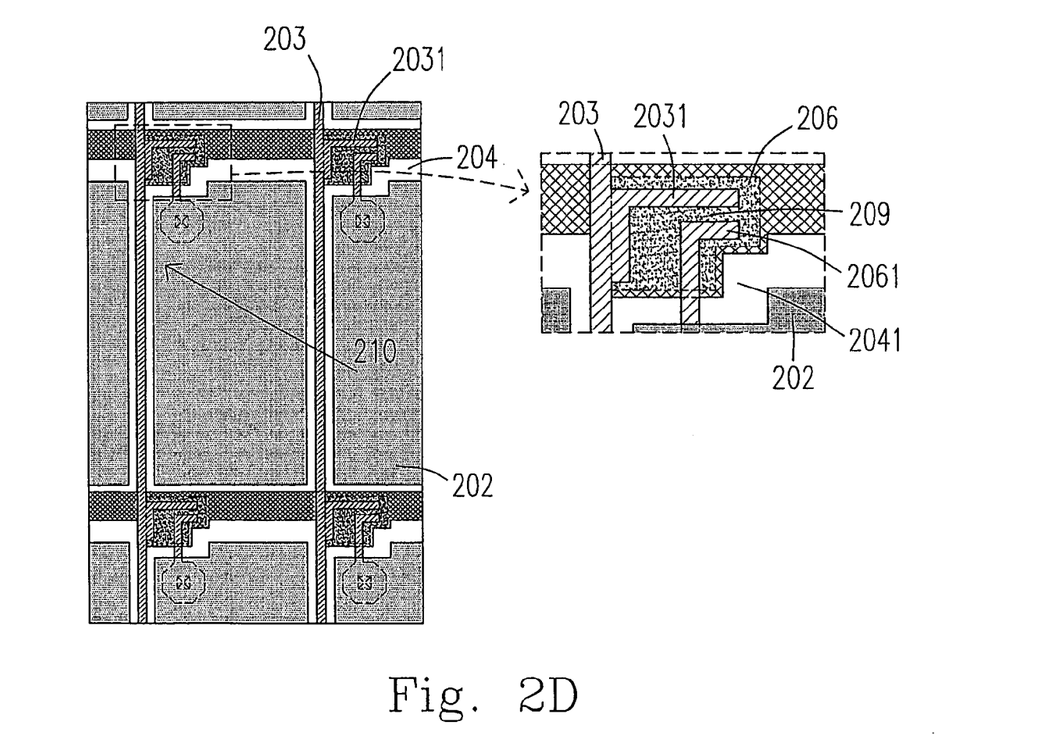

Please refer to FIGS. 2A, 2C, and 2D which respectively show the pixel structure of the optical compensated birefringence mode liquid crystal displays in the present application, and the cross-sectional view along the AA' line in FIG. 2A thereof is illustrated in FIG. 2B.

As shown in FIGS. 2A, 2C, and 2D, the gate line 204 has an extension portion 2041 close to the cross point of the gate line 204 and the data line 203. Besides the shape illustrated in FIGS. 2A, 2C, and 2D, the extension portion 2041 is also able in other shapes, such as the triangle, rectangle, L shape, stair shape, V shape, meander shape and so on. Moreover, a first electrode 2031 and a second electrode 2061 are formed in the same layer as the data line 203. The first electrode 2031 with V-shape, as the drain electrode of the thin film transistor (TFT, the switching element) 206 and the second electrode 2061 with V-shape, as the source electrode of the thin film transistor 206, are over the extension portion 2041 as gate electrode of the thin film transistor (TFT, the switching element) 206, wherein the first electrode 2031 is extending from the data line 203 and the second electrode 2061 is connected to the pixel electrode 202. Furthermore, there exists a space 209 between the first electrode 2031 and the second electrode 2061 are complementary to each other. In other words, the first electrode 2031 and the second electrode 2061 have the similar pattern to that of the extension portion 2041 of the gate line 204. In addition, as shown in FIGS. 2A, 2C, and 2D, the connection line of the bending points of the first electrode 2031 with V-shape and the second electrode 2061 with V-shape are toward the same direction to the rubbing direction 210 so as to obtain a fast phase transition time. Excepted that, the shape of the space 209 between the first electrode 2031 and the second electrode 2061 is the same as that of the first electrode 2031 and the second electrode 2061. And the shapes of the first electrode 2031 and the second electrode 2061 are complementary to each other. In other words, the first electrode 2031 and the second electrode 2061 have the similar pattern to that of the extension portion 2041 of the gate line 204. In addition, as shown in FIGS. 2A, 2C, and 2D, the connection line of the bending points of the first electrode 2031 with V-shape and the second electrode 2061 with V-shape are toward the same direction to the rubbing direction 210 so as to obtain a fast phase transition time. Except that, the shape of the space 209 between the first electrode 2031 and the second electrode 2061 is the same as that of the first electrode 2031 and the second electrode 2061. It should be noted that, besides those disclosed in FIGS. 2A, 2C, and 2D, the space 209 could be in other shapes, such as the triangle, rectangle, L shape, stair shape, V-shape, bend shape, meander-shape and so on.

Therefore, the signal in the data line 203 is first transferred to the first electrode 2031, the extension part of the data line 203. By scanning the gate line 204 in accordance with gate signals, the thin film transistors 206 in the same given gate line 204 is turned on. It means that the first electrode 2031 and the second electrode 2061 are conducted through the channel of the thin film transistor 206. Then the signal in the data line 203 is ably transferred to the second electrode 2061 via the first electrode 2031. Due to the second electrode 2061 connected to the pixel electrode 202, signals in the data line 203 are ably transferred to the pixel electrode 202 to show a picture on the relevant liquid crystal display device (not shown).

In general, the applied space 209 is ranged from 1 μm to 15 μm, preferably from 3 μm to 6 μm. The pixel electrode 202 is made from a transparent conductor, such as ITO, IZO, ITZO or AZO, and so on. Besides the above, the space 209 and the first electrode 2031 and the second electrode 2061 are also in other shapes, such as the serpentine shape, zigzag shape, crank-like shape, wave shape, frame-like shape, and cross-like shape, L shape, stair shape, bend shape, meander shape and so on.

Furthermore, as shown in FIG. 2B, a common electrode 208 is located on the first substrate (the upper glass substrate) 205, the pixel electrode 202 is located on the second substrate (the lower glass substrate) 207, and the crystal liquid molecules 201 are sandwiched between the upper glass substrate 205 and the lower glass substrate 207. In addition, the first electrode 2031 and the second electrode 2061 are in the same layer and over the part of extension portion 2041, as gate electrode of the thin film transistor (TFT, the switching element) 206.

During the process of driving an OCB mode liquid crystal display with the pixel structure shown in FIGS. 2A, 2C, and 2D, a lateral electric field, a first potential difference, is first formed by modulating the potential difference between the first electrode 2031 with V-shape and the second electrode 2061 with V-shape of the thin film transistor 206 so as to form a seed of the liquid crystal molecules therein (not shown), and then an initialization process to provide a vertical electric field is formed by modulating a second potential difference between the pixel electrode 202 and the common electrode 208 so as to result in the propagation of the bend state of the liquid crystal molecules transitioned from the seed therein. Further, a first voltage and a second voltage to the first electrode 2031 and the second electrode 2061 are individually provided so as to form said first potential difference, wherein the first voltage and the second voltage are belong to a periodic pulse signal. The individually providing step is controlled by the thin film transistors 206. Typically, the initialization process is mainly applied to provide a second potential difference between the upper glass substrate 205 and the lower glass substrate 207 to generate a second electric field for transferring alignment state of said liquid crystal layer from transition to bend. The pixel electrode 202 and the common electrode 208 respectively is formed on opposite one of said first substrate and said second substrate for providing said second potential difference.

It is suggested that the minimum voltage difference of the lateral electric field is at least 10 Volt; however it is preferably around 12~13 Volt and the uniformity of the phase transition is with respect to the voltage difference. In the same manner, the minimum voltage difference of the vertical electric field is suggested to be at least 20 Volt. Essentially, the maximum voltage difference is up to the electric tolerance of the transistor. The potential difference existing in the lateral electric field must maintain the time variation characteristic so as to keep activating the molecules to transfer to the transition state. Therefore, the lateral electric field is generated by the first voltage cooperated with a periodic voltage said second voltage.

Based upon the aforementioned, several possible types of preferred embodiments of the applied voltage variation are able to be derived therefrom. However, three typical types of preferred embodiments are provided herein. Please refer to FIGS. 3A to 3C, which respectively illustrate different types preferred embodiments of the applied voltage variation during signals inputted period including a start up phase and a normal operation phase. In the same while, please simultaneously refer to FIG. 2A-2D.

Figure 3A:
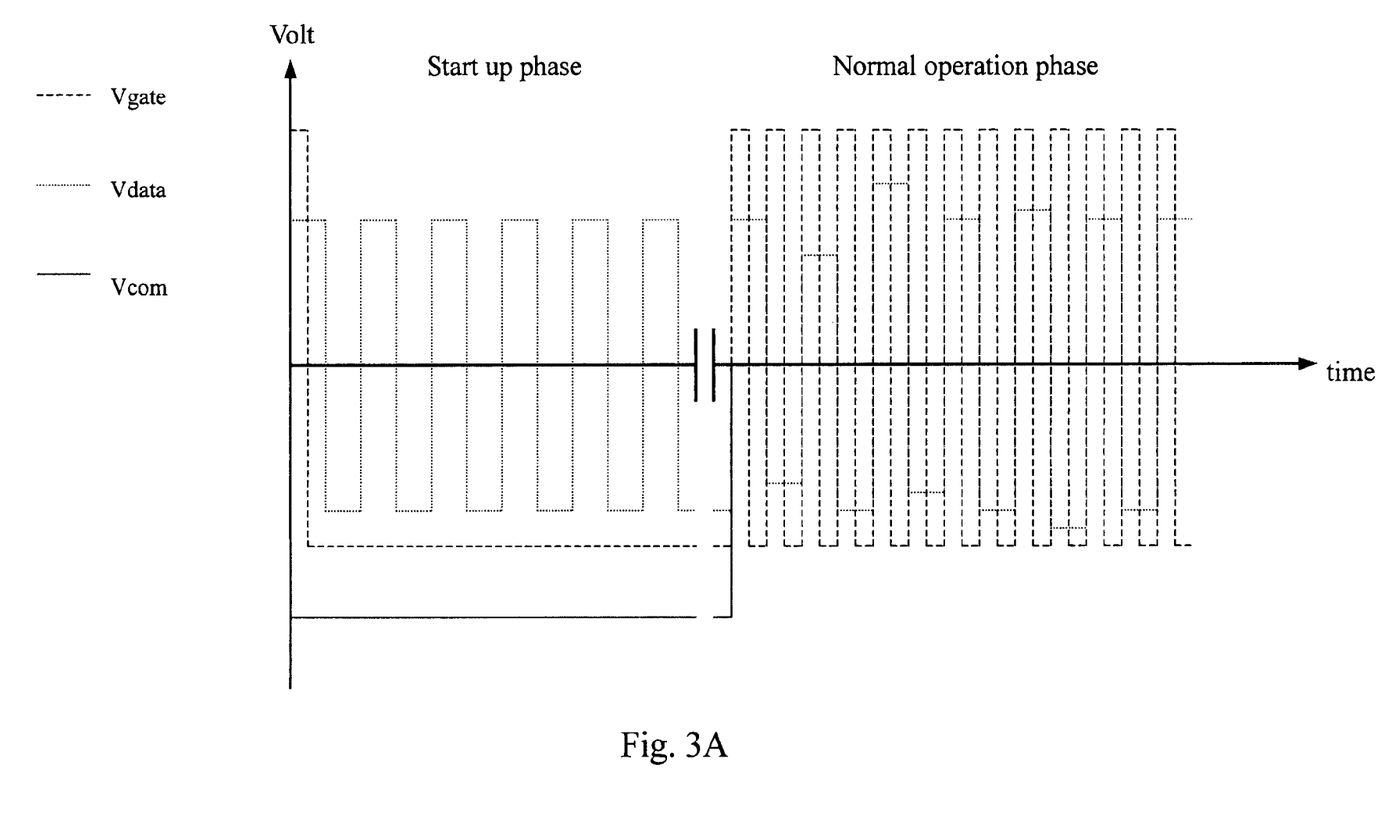
FIGS. 3A to 3C respectively illustrate three types of preferred embodiments of the applied voltage variation.

In the FIG. 3A, a first type of the voltage variation thereof is provided. At the start up phase, the gate signal Vgate of the first frame period, applied to the gate line 204 and the gate electrode 2041 of the thin film transistor 206 is a positive pulse (or high voltage signal) input to turn on the thin film transistor 206. And the data signal Vdata of the first frame period, inputs the first electrode 2031, the second electrode 2061 and the pixel electrode 202 via the channel of thin film transistor 206. However, the gate signal Vgate is soon transferred to a negative pulse (or low voltage signal) input in the next frame period and turns off the thin film transistor rapidly, thereafter the gate signal Vgate will keep a negative pulse (or low voltage signal) input at the start up phase. In other words, the positive pulse of the gate signal Vgate is also named as a first gate signal, and the negative pulse of the gate signal Vgate is also named as a second gate signal. Thus the second electrode 2061 and the pixel electrode 202 will keep a first voltage written and stored from the data signal Vdata at the first frame period of start up phase. Furthermore, the data signal Vdata, as a period pulse signal, applied to the data line 203 transmitted to the first electrode 2031 is like a step function shape with high-low signal to provide a second voltage to the first electrode even as the thin film transistor 206 turns off, and then form a first potential difference between the first electrode 2031 and the second electrode 2061 in order to form a lateral electric field. As the first potential difference is reached at least 10 volt, the liquid crystal molecules therebetween will transfer from splay state to transition state via the lateral electric field. Excepted that, the third voltage Vcom is provided to the common electrode 208 so as to maintain a second potential difference between the pixel electrode 202 and the common electrode 208 in order to form a vertical electric field, thus the liquid crystal molecules therein will transfer rapidly from the transition to the bend state, and the second potential difference accelerates the propagation of the bend state of the liquid crystal molecules of whole pixel region, namely an initialization process. For example, if the first voltage is 6 Volt, the second voltage is preferred to be −6 Volt and the third voltage is preferred to be −25 Volt. When the state transition of the liquid crystal is completed, operating signals including normally periodic gate signals and normally periodic data signals will be inputted during the operation phase. In the other word, the operation signals input to the gate line 204, the data lines 203, the first electrode 2031, the second electrode 2061 and the pixel electrode 202. Furthermore, the third voltage will change normal voltage level, prefer to 5-7 Volt.

Figure 3B:
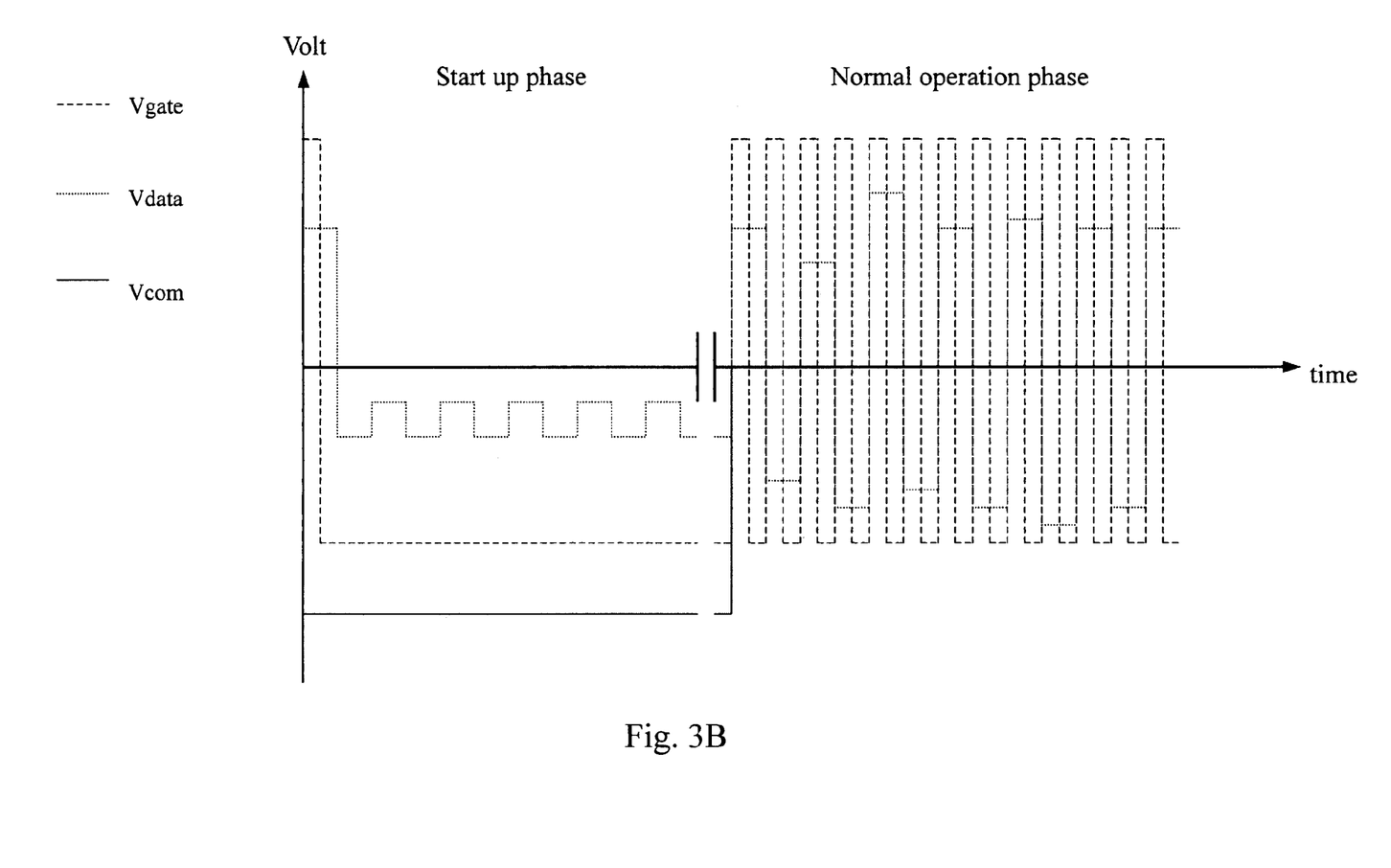

For a modification of the above first type thereof is provided in FIG. 3B and please simultaneously also refer to FIG. 2A-2D. At the start up phase, The gate signal Vgate of the first frame period, applied to the gate line 204 and the gate electrode 2041 of the thin film transistor 206 is a positive pulse (or high voltage signal) input to turn on the thin film transistor 206. And the data signal Vdata of the first frame period, inputs the first electrode 2031, the second electrode 2061 and the pixel electrode 202 via the channel of thin film transistor 206. However, the gate signal Vgate is soon transferred to a negative pulse (or low voltage signal) input in the next frame period and turns off the thin film transistor rapidly, thereafter the gate signal Vgate will keep a negative pulse (or low signal) input during start up phase. Thus the second electrode 2061 and the pixel electrode 202 will keep a first voltage written and stored from the data signal Vdata at the first frame period of start up phase. In other words, the positive pulse of the gate signal Vgate is also named as a first gate signal, and the negative pulse of the gate signal Vgate is also named as a second gate signal. Then the data signal Vdata, as a periodic pulse signal, applied to the data line 203 transmitted to the first electrode 2031 is like a step function shape with milder high-low signal to provide a steady second voltage to the first electrode as the thin film transistor 206 turns off, and then form a steady first potential difference between the first electrode 2031 and the second electrode 2061 in order to form a lateral electric field, wherein the variation of first potential difference will milder and obtain much better transition performance for the liquid crystal molecules. As the first potential difference is reached at least 10 Volt, the liquid crystal molecules therebetween will transfer from splay state to transition state via the lateral electric field. Excepted that, the third voltage Vcom is provided to the common electrode 208, so as to maintain a second potential difference between the pixel electrode 202 and the common electrode 208 in order to form a vertical electric filed, thus the liquid crystal molecules therein will transfer rapidly from the splay state or the transition state to the bend state, and the second potential difference accelerates the propagation of the bend state of the liquid crystal molecules of whole pixel region, namely an initialization process. When the state transition of the liquid crystal is completed, operating signals including normally periodic gate signals and normally periodic data signals will be inputted during the operation phase. In the other word, the operation signals input to the gate lines 204, the data lines 203, the first electrode 2031, the second electrode 2061, and the pixel electrode 202. Furthermore, the third voltage will change normal voltage level, prefer to 5-7 Volt.

Figure 3C:
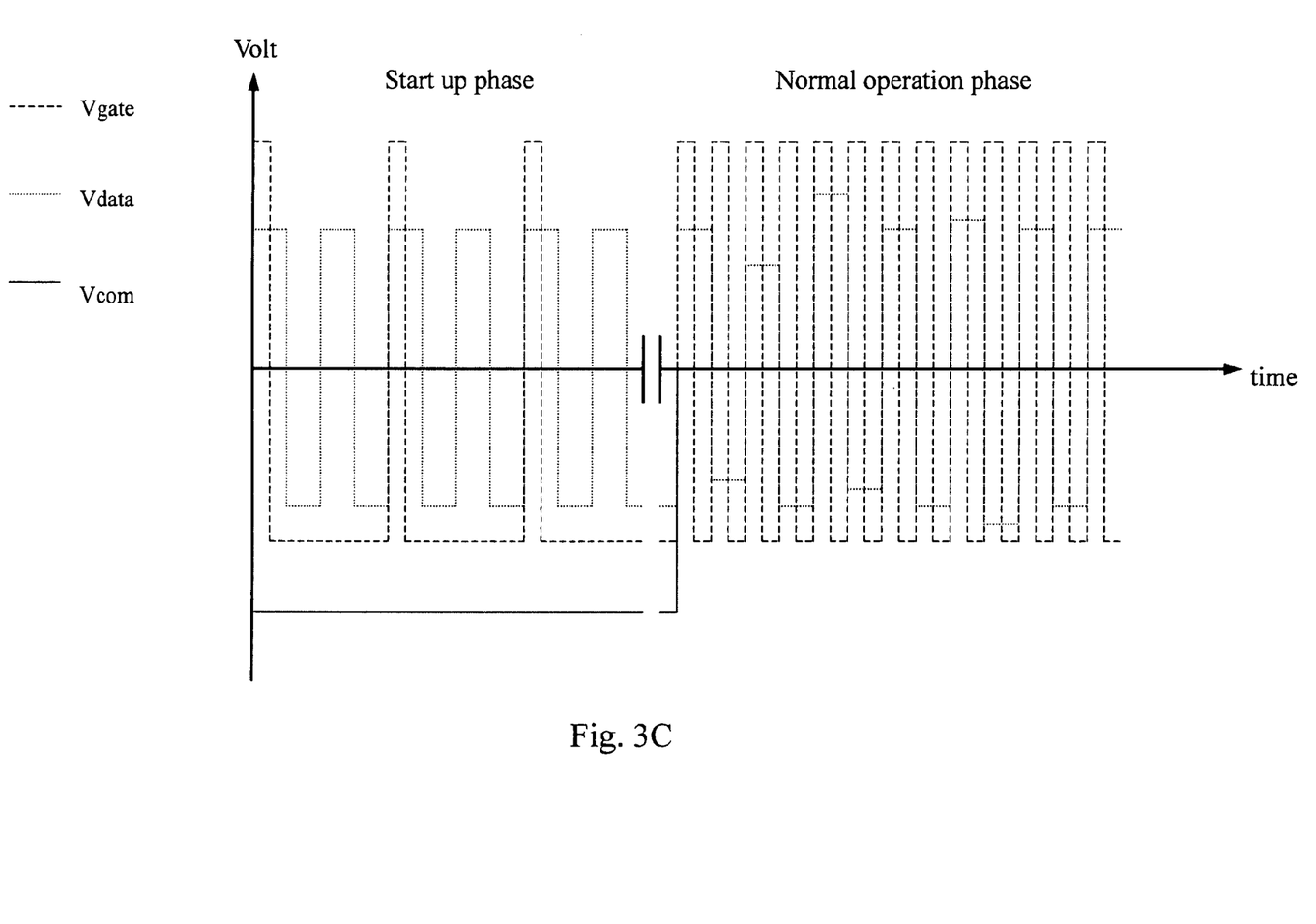

For another modification of the above first type thereof is provided in FIG. 3C and please simultaneously also refer to FIGS. 2A-2D. Due to gradually losing the first voltage in the pixel electrode 202 and the second electrode 2061, the gate signal Vgate and the data signal Vdata are both in a periodic pulse so as to re-supply the first voltage stored in mention above at the start up phase. In more detail, the data signal Vdata, as a periodic pulse signal, applied to the data line 203 transmitted to the first electrode 2031 is like a step function shape with high-low signal. Thus, the gate signal Vgate applied to the gate line 204 and the gate electrode 2041 of the thin film transistor 206 is a positive pulse (or high voltage signal) input to turn on the thin film transistor 206 only when the data signal Vdata is at high voltage at the start up phase. However, the gate signals Vgate do not need match up all data signals Vdata with a positive pulse one by one. And the data signal Vdata further inputs the second electrode 2061 and the pixel electrode 202 via the channel of thin film transistor 206. However, the gate signal Vgate is soon transferred to a negative pulse (or low voltage signal) and turns off the thin film transistor rapidly so as to keep a first voltage in the second electrode 2061 and the pixel electrode 202 before the thin film transistor 206 turns on next time. No matter the thin film transistor 206 is ON or OFF, the data signal Vdata keep provide a second voltage to the first electrode 2031 and then form a first potential difference between the first electrode 2031 and the second electrode 2061 in order to form a lateral electric field. As the first potential difference is reached at least 10 Volt, the liquid crystal molecules therebetween will transfer from splay state to transition state via the lateral electric field. Excepted, the third voltage Vcom is provided to the common electrode 208, so as to maintain a second potential difference between the pixel electrode 202 and the common electrode 208 in order to form a vertical electric field, thus the liquid crystal molecules therein will transfer rapidly from the splay state or the transition state to the bend state, and the second potential difference accelerates the propagation of the bend state of the liquid crystal molecules of whole pixel region, namely an initialization process. For example, if the first voltage is 6 Volt, the second voltage is preferred to be 0 to −6 Volt, and the third voltage is preferred to be −25 Volt. When the state transition of the liquid crystal is completed, operating signals including normally periodic gate signals and normally periodic data signals will be inputted during the operation phase. In the other word, the operation signals input to the gate lines 204, the data lines 203, the first electrode 2031, the second electrode 2061, and the pixel electrode 202. Furthermore, the third voltage will change normal voltage level, prefer to 5-7 Volt.

Typically, it is found the transition time for the liquid crystal molecules from the start up phase to the operation phase is about 1.0~3.0 second. It is However, during the driving process, since there is a space 209 between the first electrode 2031 and the second electrode 2061, a lateral electric field could be formed by modulating the potential difference therebetween. In addition, the pixel electrode 202 is overlapped with the common electrode 608 located on the upper glass substrate, and thus a vertical electric field might be formed by modulating the potential difference therebetween.

As aforementioned, since the alignment state transition of the liquid crystal molecule from the splay state into the bend state at the start of LCDs operation is performed based upon the both the drain electrode and the source electrode of the thin film transistor without implementing extra electrodes on the pixels, the LCDs using the pixel structure and driving method or both of the present invention has an excellent aperture ratio as well as a high display quality. As compared with the conventional LCDs using the extra electrodes for transitioning the alignment state of the liquid crystal molecule, the present application increases the brightness and the contrast of the panel thereof.

It should be noted that according to the present application a lateral electric field is formed by modulating the potential differences between two electrodes of the thin film transistor, an excellent aperture ratio is well provided as compared with the conventional driving method. Furthermore, the above-applied voltages need not be limited to the disclosed embodiments. In addition, as above, it is also found that no matter a periodic voltage or a direct voltage is supplied to the first or second electrode, the transition time for the liquid crystal molecules according to the driving method of the present application is less than 3.0 sec.

As above, according to the pixel structure and the driving method of the present application, the period for transforming the liquid crystal molecule from the splay state into the bend state at the start-up of LCDs operation could be minimized and in the same while the aperture ratio could be increased, as well as a high display quality. Substantially, the present application does have the progressiveness, novelty and industrial utility.

While the application has been described in terms of what are presently considered to be the most practical and preferred embodiments, it is to be understood that the application need not be limited to the disclosed embodiment. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present application which is defined by the appended claims.

What is claimed is:

1. A method for activating a state transition of a liquid crystal layer in a liquid crystal display comprising a first substrate, a second substrate and plural pixel structures, wherein said liquid crystal layer is sandwiched between said first substrate and said second substrate and each of said plural pixel structures has at least one switching element having a drain electrode and a source electrode, each of said drain and said source electrodes having a V-shape and respective edges being complementary to each other, wherein a connection line of a plurality of bending points of said V-shapes of said drain and said source electrodes is substantially parallel to a rubbing direction, said method comprising steps of:
    providing a first potential difference between said drain electrode and said source electrode to generate a first electric field; and
    performing an initialization process seeded from said drain and said source electrode to transfer alignment state of said liquid crystal layer from splay to bend.

2. The method as claimed in claim 1, wherein said switching element is a thin film transistor (TFT) having said drain electrode and said source electrode.

3. The method as claimed in claim 1, wherein said first potential difference is a lateral voltage difference of at least 10 V.

4. The method as claimed in claim 1 further comprising the step of: individually providing a first voltage and a second voltage to said drain and said source electrodes to form said first potential difference.

5. The method as claimed in claim 4, wherein individually providing step is controlled by said switching element.

6. The method as claimed in claim 4, wherein a first voltage and a second voltage belong to one of a periodic pulse signal and a pulse signal.

7. The method as claimed in claim 1, wherein said initialization process further comprising the step of:
    providing a second potential difference between said first substrate and said second substrate to generate a second electric field for transferring alignment state of said liquid crystal from splay to bend.

8. The method as claimed in claim 7, wherein said second potential difference is a vertical voltage difference of at least 20 V.

9. An optical compensated birefringence mode liquid crystal display activated by said method of claim 7.

10. The optical compensated birefringence mode liquid crystal display as claimed in claim 9 further comprising a pixel electrode and a common electrode respectively formed on opposite one of said first substrate and said second substrate for providing said second potential difference.

11. The optical compensated birefringence mode liquid crystal display as claimed in claim 9, wherein a space between said drain electrode and said source electrode is ranged from 1 μm to 15 μm.

12. The optical compensated birefringence mode liquid crystal display as claimed in claim 11, wherein said space is preferably ranged from 1 μm to 6 μm.

13. A method for operating a liquid crystal display comprising a first substrate, a second substrate, plural pixel structures and a liquid crystal layer sandwiched between said first substrate and said second substrate, wherein each of said plural pixel structures has at least one switching element having a drain electrode and a source electrode, each of said drain and said source electrodes having a V-shape and respective edges being complementary to each other, wherein a connection line of a plurality of bending points of said V-shapes of said drain and said source electrodes is substantially parallel to a rubbing direction, so as to transfer said liquid crystal display from a start up phase to a normal operation phase, said method comprising steps of:

providing a pulse signal to one of said drain and said source electrodes and providing a periodic pulse signal to another one of said drain and said source electrodes to generate a first electric field;

providing a potential difference between said first and said second substrates to generate a second electric field;

driving said liquid crystal display from said start up phase to said normal operation phase by said first and said second electric fields; and providing operating signals to said drain and said source electrodes.

14. The method as claimed in claim 13, wherein said switching element is a thin film transistor (TFT) having said drain electrode and said source electrode.

15. The method as claimed in claim 13 further comprising the step of:

providing a turn-on signal to turn on said switching element for providing an pulse signal to one of said drain and said source electrodes.

16. The method as claimed in claim 15 further comprising the step of:

providing a turn-off signal to turn off said switching element for providing a periodic pulse signal to one of said drain and said source electrodes which connects to data line to generate a first electric field.

17. The method as claimed in claim 16, wherein the turn-on signal and the turn-off signal form a periodic signal during a period of said start up phase.

18. The method as claimed in claim 15, wherein said pulse signal is a voltage signal.

19. The method as claimed in claim 16, wherein a potential difference between a maximum value and a minimum value of said periodic pulse signal is at least 10 V.

20. The method as claimed in claim 13, wherein said potential difference is a vertical voltage difference of at least 20 V.

* * * * *